United States Patent
Shoji et al.

(10) Patent No.: US 9,419,426 B2
(45) Date of Patent: Aug. 16, 2016

(54) SEALING-MEMBER-EQUIPPED SHIELDED CABLE

(71) Applicant: SANYO DENKI CO., LTD., Tokyo (JP)

(72) Inventors: Yoshihiro Shoji, Tokyo (JP); Kazuhiro Makiuchi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 0 days.

(21) Appl. No.: 14/181,882

(22) Filed: Feb. 17, 2014

(65) Prior Publication Data

US 2014/0231134 A1 Aug. 21, 2014

(30) Foreign Application Priority Data

Feb. 18, 2013 (JP) ................................. 2013-029078

(51) Int. Cl.
| | |
|---|---|
| *H01R 9/05* | (2006.01) |
| *H01R 24/52* | (2011.01) |
| *H01R 11/12* | (2006.01) |
| *H02G 15/013* | (2006.01) |

(52) U.S. Cl.
CPC .............. *H02G 15/013* (2013.01); *H01R 9/05* (2013.01); *H01R 11/12* (2013.01); *H01R 24/52* (2013.01)

(58) Field of Classification Search
CPC ......... H01R 13/74; H01R 13/648; H01R 4/64
USPC ................................ 174/650; 439/63, 607.01
See application file for complete search history.

(56) References Cited

U.S. PATENT DOCUMENTS

| | | | | |
|---|---|---|---|---|
| 4,579,405 A | * | 4/1986 | Hirooka | ............... H01R 9/2491 439/106 |
| 6,261,108 B1 | * | 7/2001 | Kanagawa | ......... H01R 13/6596 439/98 |
| 6,524,121 B2 | * | 2/2003 | Kanagawa | ........... H01R 9/0518 439/95 |
| 6,805,588 B2 | * | 10/2004 | Yamamoto | ............... 439/607.41 |
| 7,153,146 B2 | * | 12/2006 | Shimizu et al. | ................. 439/98 |
| 7,393,218 B1 | * | 7/2008 | Pavlovic | ................. H01R 4/646 439/939 |
| 2002/0098720 A1 | | 7/2002 | Noda | |
| 2002/0155756 A1 | * | 10/2002 | Yoshioka | ....................... 439/607 |
| 2012/0329323 A1 | * | 12/2012 | Fink et al. | ................ 439/607.01 |

FOREIGN PATENT DOCUMENTS

| | | | | |
|---|---|---|---|---|
| CN | 102751622 A | | 10/2012 | |
| DE | WO 2011/107075 | * | 9/2011 | ............... H01R 4/04 |
| EP | 0129424 A1 | | 12/1984 | |
| FR | 2917245 A1 | | 12/2008 | |

(Continued)

OTHER PUBLICATIONS

European Search Report dated May 21, 2014.

(Continued)

*Primary Examiner* — Michael F McAllister
(74) *Attorney, Agent, or Firm* — Polsinelli PC

(57) ABSTRACT

A sealing-member-equipped shielded cable includes a shielded cable that includes shielded wires and a sealing member that is molded from a resin and that includes an electrically conductive member in at least a portion thereof. The sealing member is integrally formed on one end portion of the shielded cable, and the shielded wires are electrically connected to the electrically conductive member of the sealing member.

14 Claims, 5 Drawing Sheets

(56) References Cited

FOREIGN PATENT DOCUMENTS

| | | | | |
|---|---|---|---|---|
| JP | 2000116055 A | 4/2000 | | |
| JP | 2002-203618 | * 7/2002 | ............... | H01R 9/05 |
| JP | 2002203618 A | 7/2002 | | |

OTHER PUBLICATIONS

Communication dated Jun. 1, 2016 from European Patent Application No. 14 155 286.9, pp. 1-5.

* cited by examiner

SEALING-MEMBER-EQUIPPED SHIELDED CABLE

CROSS-REFERENCE TO RELATED APPLICATION

This application claims priority to Japanese Application No. 2013-029078, filed Feb. 18, 2013, the entirety of which is incorporated herein by reference.

BACKGROUND

1. Technical Field

The present invention relates to a sealing-member-equipped shielded cable that facilitates connection of the shielded cable to an electronic device.

2. Description of Related Art

A shielded cable is used for supplying power to and for transmitting and receiving signals from and to an electronic device such as an encoder (a rotation detector) while preventing a malfunction due to the influence of electromagnetic noise. Such a shielded cable includes shielded wires to be connected to a ground.

In the case of connecting a shielded cable to an electronic device, it is necessary to connect shielded wires to a frame ground (FG) in order to secure the noise resistance of the shielded cable. In the related art, in the case of connecting a shielded cable to an electronic device, shielded wires are tied together in a bundle at an end of the shielded cable after a covering has been removed, a solderless terminal is attached to the bundle, a screw is inserted through a washer of the solderless terminal, and the screw is fixed to an inlet portion of a cover of the electronic device by being screwed into the inlet portion of the cover of the electronic device.

In particular, a precision electronic device such as an encoder is required to have dust resistance and drip resistance, and thus, a shielded cable is inserted through a rubber gasket and held in place by a cap or the like.

As a technology that relates to a connection structure of a shielded cable, a motor with a shielded wire in which a step portion that is formed by peeling off a shielded portion of a shielded motor lead wire in a stepwise manner is fixed to an electrically conductive member, which forms or partly forms a surface of a motor, via an electrically conductive gasket has been disclosed (see, for example, Japanese Unexamined Patent Application Publication No. 2000-116055).

In the connection structure of the shielded cable disclosed in Japanese Unexamined Patent Application Publication No. 2000-116055, the electrically conductive gasket and a shielded cable (the motor lead wire) are different components. In order to allow the shielded cable to have dust resistance and drip resistance with certainty, it is necessary to hold the electrically conductive gasket in place by an additional component such as a cap or to use an adhesive in combination with the additional component in such a manner that the electrically conductive gasket and the shielded cable are adhered tightly to each other. Therefore, in a connection structure of a shielded cable of the related art, the number of components is large, and the workload is increased.

SUMMARY

The present invention provides a sealing-member-equipped shielded cable capable of securing noise resistance, dust resistance, and drip resistance and of reducing workload.

A sealing-member-equipped shielded cable according to an aspect of the present invention includes a shielded cable that includes a shielded wire and a sealing member that is molded from a resin and at least a portion of which is an electrically conductive portion.

The sealing member is integrally formed on one end of the shielded cable. The shielded wire is electrically connected to the electrically conductive portion of the sealing member.

According to the sealing-member-equipped shielded cable according to the present invention, the sealing member having electrical conductivity is integrally formed on at least a portion of the shielded cable, and the shielded wire is electrically connected to the conductive portion of the sealing member.

Therefore, in the sealing-member-equipped shielded cable according to the present invention, the degree of contact between the shielded cable and the sealing member is large, connection of the sealing-member-equipped shielded cable and a frame ground can be performed simply by fixing the sealing member to an inlet portion of a cover of an electronic device, and noise resistance, dust resistance, and drip resistance can be secured.

In addition, since the sealing member and the shielded cable are integrally formed, and the number of components is small, the workload can be reduced.

DETAILED DESCRIPTION

Connection structures of shielded cables according to a first embodiment to a third embodiment will be described below with reference to the drawings.

In each of the shielded cables with sealing members according to the first embodiment to the third embodiment, a sealing member having electrical conductivity is integrally formed on at least a portion of a shielded cable, and shielded wires are electrically connected to a conductive portion of the sealing member.

Therefore, in each of the shielded cables with sealing members according to the first embodiment to the third embodiment, the degree of contact between the shielded cable and the sealing member is large, connection of the sealing-member-equipped shielded cable and a frame ground can be performed simply by fixing the sealing member to an inlet portion of a cover of an electronic device, and noise resistance, dust resistance, and drip resistance can be secured. In other words, according to the first embodiment to the third embodiment, a sealing-member-equipped shielded cable capable of securing noise resistance, dust resistance, and drip resistance and of reducing workload can be realized.

First Embodiment 1

Configuration of Sealing-Member-Equipped Shielded Cable

First, a configuration of a sealing-member-equipped shielded cable according to a first embodiment will be described with reference to FIG. 1A to FIG. 3.

Figure 1A:
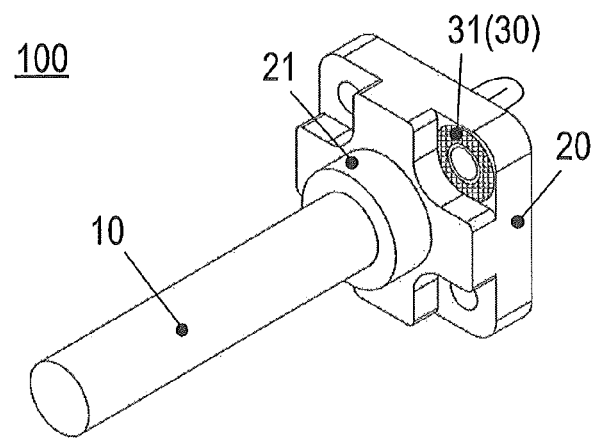
FIG. 1A is a perspective view of a sealing-member-equipped shielded cable according to a first embodiment as viewed from an outer surface side.
Figure 1B:
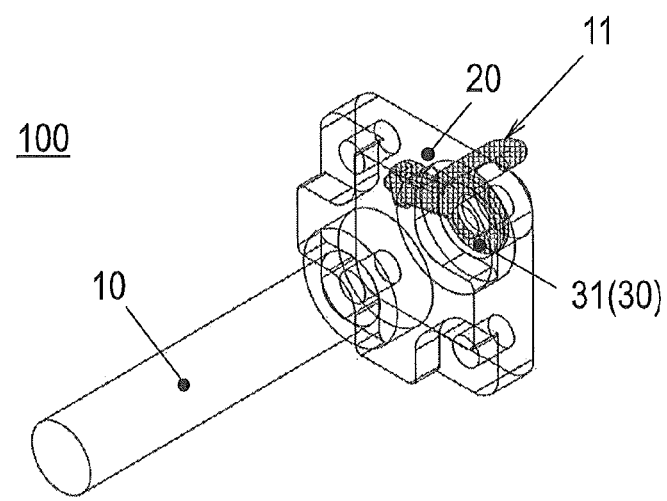
FIG. 1B is a perspective view of an internal structure of the sealing-member-equipped shielded cable according to the first embodiment as viewed from the outer surface side.
Figure 1C:
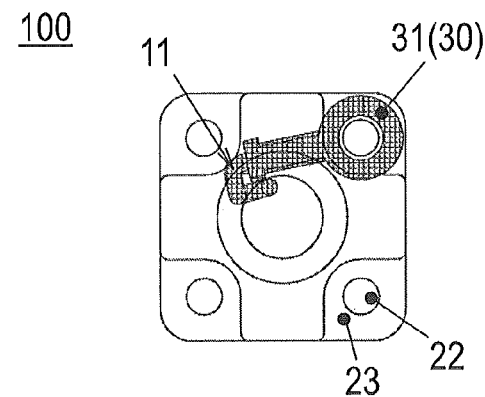
FIG. 1C is a front view of the internal structure of the sealing-member-equipped shielded cable according to the first embodiment as viewed from the outer surface side.
Figure 2A:
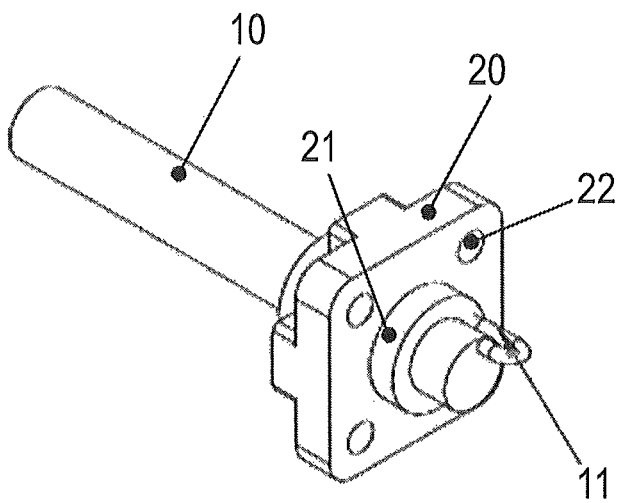
FIG. 2A is a perspective view of the sealing-member-equipped shielded cable according to the first embodiment as viewed from an inner surface side.
Figure 2B:
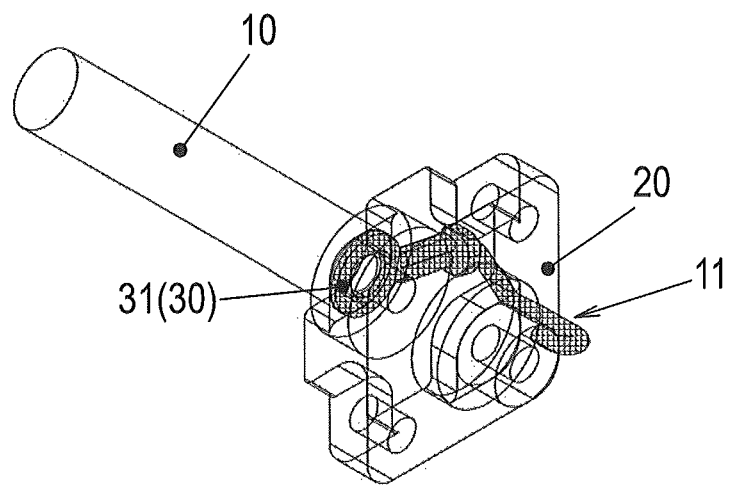
FIG. 2B is a perspective view of the internal structure of the sealing-member-equipped shielded cable according to the first embodiment as viewed from the inner surface side.
Figure 3:
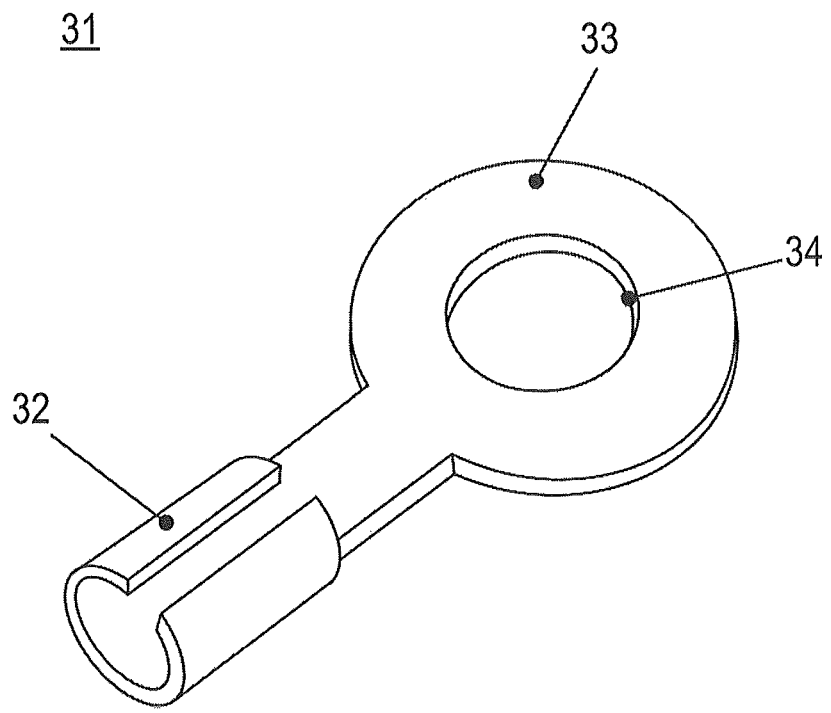
FIG. 3 is a perspective view of an exemplary solderless terminal.

FIG. 1A is a perspective view of the sealing-member-equipped shielded cable according to the first embodiment as viewed from an outer surface side. FIG. 1B is a perspective view of an internal structure of the sealing-member-equipped shielded cable as viewed from the outer surface side. FIG. 1C is a front view of the internal structure as viewed from the outer surface side. FIG. 2A is a perspective view of the sealing-member-equipped shielded cable according to the first embodiment as viewed from an inner surface side. FIG. 2B is a perspective view of the internal structure of the sealing-member-equipped shielded cable as viewed from the inner surface side. FIG. 3 is a perspective view of an exemplary solderless terminal.

As illustrated in FIG. 1A, FIG. 1B, FIG. 2A, and FIG. 2B, a sealing-member-equipped shielded cable 100 according to the first embodiment includes a shielded cable 10 and a sealing member 20.

The shielded cable 10 is a cable for preventing a malfunction of an electronic device due to the influence of electromagnetic noise and includes shielded wires 11 within a cable covering material.

The sealing member 20 is made of, for example, a thermoplastic resin such as a polyethylene or a polypropylene and is molded in a metal mold. The sealing member 20 is integrally formed on one end portion of the shielded cable 10. The sealing member 20 is integrally formed by increasing the diameter thereof along the periphery of a connection-side end portion of the shielded cable 10.

The sealing member 20 of the present embodiment is in the form of a rectangular flange and is molded from a resin in a state where the shielded cable 10 is received in a boss portion 21 of a center portion of the sealing member 20. Insertion holes 22 that are to be used for fixing the sealing member 20 in place with screws are formed at four corners of the sealing member 20, which is in the form of a flange. A recess 23 on which a head portion of a screw (not illustrated) is to be seated is formed around the periphery of each of the insertion holes 22 of the sealing member 20 on the outer surface side.

The sealing member 20 includes an electrically conductive portion as at least a portion thereof. In the sealing member 20 of the present embodiment, the electrically conductive portion is formed as a portion of the sealing member 20 by embedding an electrically member 30 in the sealing member 20 during the period when the sealing member 20 is being molded from a resin. The shielded wires 11 are electrically connected to the electrically conductive portion of the sealing member 20.

The electrically conductive member 30 of the present embodiment is formed of, for example, a solderless terminal 31, which is illustrated in FIG. 3. The solderless terminal 31 includes a cylindrical crimp body portion 32 that presses and fixes the shielded wires 11 in place and a washer 33 that is formed on a tip side of the cylindrical crimp body portion 32 and that has an insertion hole 34.

The shielded wires 11 that are tied together in a bundle after a covering has been removed are inserted into the cylindrical crimp body portion 32 of the solderless terminal 31, and the cylindrical crimp body portion 32 is fixed in place by applying pressure thereto in an inward radial direction in such a manner that the solderless terminal 31 and the shielded wires 11 are electrically connected to each other. The material out of which the solderless terminal 31 is made is selected in view of electrical conductivity and crimping performance, and for example, an oxygen-free copper (JIS C1011) terminal coated with tin is employed.

As illustrated in FIG. 2A and FIG. 2B, the shielded wires 11 are folded back on the side of a connection end of the shielded cable 10 (the inner surface side), and the connection end of the shielded cable 10 is disposed in a metal mold together with the solderless terminal 31. Then, as illustrated in FIG. 1A to FIG. 1C, the sealing member 20 is molded from a resin in a state where the electrically conductive portion is exposed at the outer surface of the sealing member 20. More specifically, the washer 33 of the solderless terminal 31 is exposed at one of the recesses 23, which are formed around the periphery of the corresponding insertion holes 22 on the outer surface side of the sealing member 20, which is in the form of a flange.

Advantageous Effects of Sealing-Member-Equipped Shielded Cable

Advantageous effects of the sealing-member-equipped shielded cable 100 according to the first embodiment will now be described with reference to FIG. 1A to FIG. 3.

In the sealing-member-equipped shielded cable 100 according to the first embodiment, the sealing member 20, which is in the form of a flange, is integrally formed on the periphery of the shielded cable 10 on the side of the connection end. The sealing member 20 is molded from a resin, and the electrically conductive member 30 is embedded in the sealing member 20 as the electrically conductive portion during the period when the sealing member 20 is being molded.

Since the electrically conductive member 30 of the present embodiment is formed of the solderless terminal 31, the electrically conductive member 30 is easily electrically connected to the shielded wires 11. The washer 33 of the solderless terminal 31 is exposed at one of the recesses 23, which are formed around the periphery of the corresponding insertion holes 22 on the outer surface side of the sealing member 20. Therefore, the sealing-member-equipped shielded cable 100 can be easily connected to a frame ground simply by fixing the sealing member 20 to an inlet portion of a cover of an electronic device (not illustrated) with screws.

According to the sealing-member-equipped shielded cable 100 of the first embodiment, the sealing member 20 having electrical conductivity is integrally formed on at least a portion of the shielded cable 10. The electrically conductive member 30 (the solderless terminal 31) is embedded in the sealing member 20 in such a manner as to serve as the electrically conductive portion of the sealing member 20, and the shielded wires 11 are electrically connected to the electrically conductive portion by the solderless terminal 31. Therefore, in the sealing-member-equipped shielded cable 100 of the first embodiment, the degree of contact between the shielded cable 10 and the sealing member 20 is large, and noise resistance, dust resistance, and drip resistance can be secured.

In addition, since the sealing member 20 and the shielded cable 10 are integrally formed, and the number of components is small, the workload can be reduced.

Second Embodiment

A configuration of a sealing-member-equipped shielded cable 200 according to a second embodiment will now be described with reference to FIG. 4A to FIG. 4C.

Figure 4A:
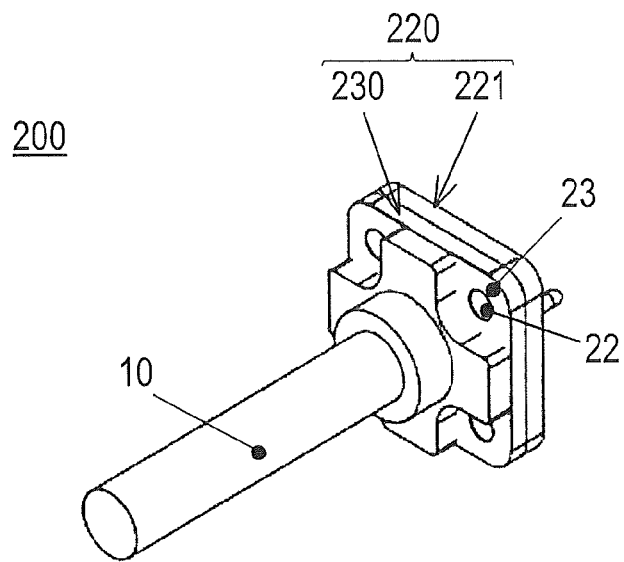
FIG. 4A is a perspective view of a sealing-member-equipped shielded cable according to a second embodiment as viewed from an outer surface side.
Figure 4B:
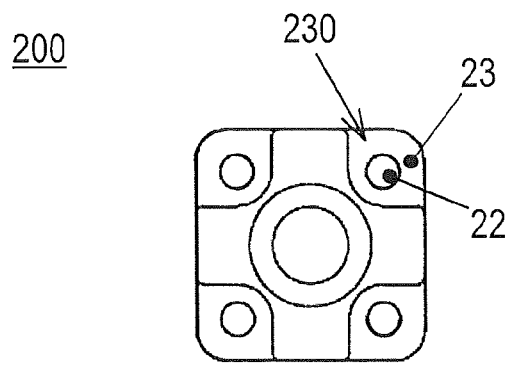
FIG. 4B is a front view of the sealing-member-equipped shielded cable according to the second embodiment as viewed from the outer surface side.
Figure 4C:
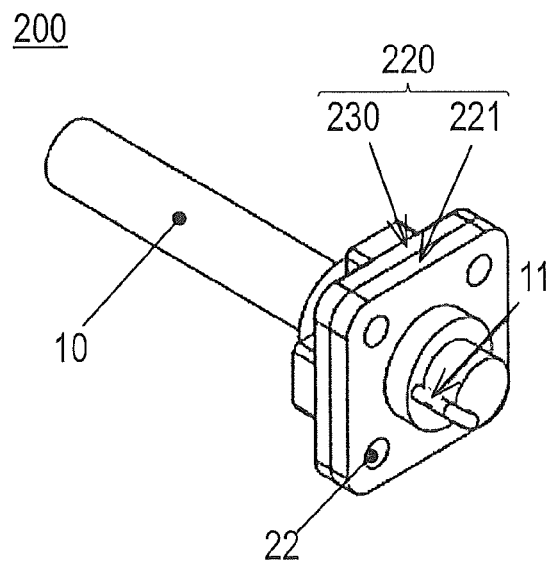
FIG. 4C is a perspective view of the sealing-member-equipped shielded cable according to the second embodiment as viewed from an inner surface side.

FIG. 4A is a perspective view of the sealing-member-equipped shielded cable 200 according to the second embodiment as viewed from an outer surface side, FIG. 4B is a front view of the sealing-member-equipped shielded cable 200 as viewed from the outer surface side, and FIG. 4C is a perspective view of the sealing-member-equipped shielded cable 200 as viewed from an inner surface side. Note that the same components as in the first embodiment are denoted by the same reference numerals, and repeated descriptions will be avoided.

As illustrated in FIG. 4A to FIG. 4C, in the sealing-member-equipped shielded cable 200 according to the second embodiment, a difference from the first embodiment is that a metal plate 230 is used as an electrically conductive member. As the metal plate 230, which has electrical conductivity, for example, a metal plate that is made of, copper, aluminum, or the like and that has a good electrical conductivity, good processability, and good formability is used.

The metal plate 230 of the present embodiment is arranged as a layer of a sealing member 220, which is in the form of a flange, on the outer surface side. As illustrated in FIG. 4C, the shielded wires 11 are folded back on the side of a connection end of the shielded cable 10 (the inner surface side). Ends of the shielded wires 11 from which a covering has been removed are electrically connected to the metal plate 230 and disposed in a metal mold. Then, as illustrated in FIGS. 4A and 4B, the sealing member 220 is molded from a resin in a state where the metal plate 230 is disposed on the outer surface side of the sealing member 220.

In other words, in a state where the sealing member 220, which is in the form of a flange, is being molded, a complex having a two-layer structure of a metal and a resin in which the metal plate 230 and a resin layer 221 serve as the layer of the sealing member 220 on the outer surface side and a layer of the sealing member 220 on the inner surface side, respectively, is formed.

The sealing-member-equipped shielded cable 200 of the second embodiment basically provides advantageous effects similar to those of the first embodiment.

In particular, in the sealing-member-equipped shielded cable 200 of the second embodiment, the metal plate 230 is disposed on the outer surface side of the sealing member 220, and thus, the entire surface of the sealing member 220 on the outer surface side is an electrically conductive portion. Therefore, the sealing-member-equipped shielded cable 200 provides an advantageous effect in that the metal plate 230 is easily supported in a metal mold.

Note that the entire surface of the sealing member 220 on the outer surface side is not necessarily formed of the metal plate 230 as long as the metal plate 230 is arranged, for example, in such a manner as to be exposed at least at the recesses 23, which are formed around the periphery of the corresponding insertion holes 22, on the outer surface of the sealing member 220.

Third Embodiment

A configuration of a sealing-member-equipped shielded cable 300 according to a third embodiment will now be described with reference to FIG. 5A and FIG. 5B.

Figure 5A:
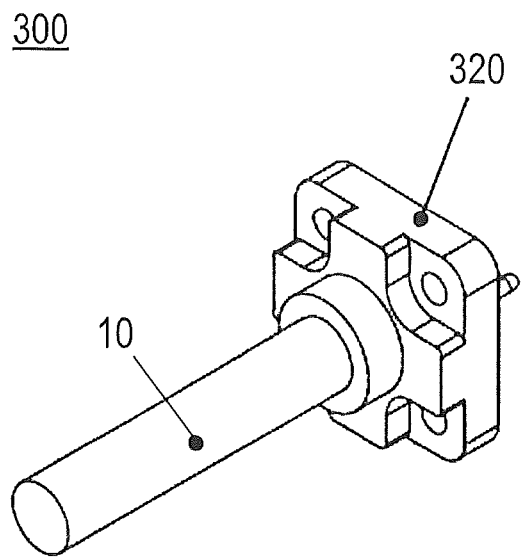
FIG. 5A is a perspective view of a sealing-member-equipped shielded cable according to a third embodiment as viewed from an outer surface side.
Figure 5B:
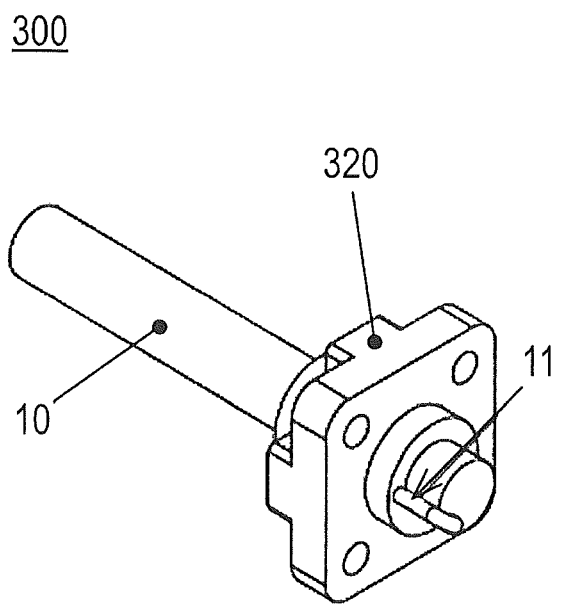
FIG. 5B is a perspective view of the sealing-member-equipped shielded cable according to the third embodiment as viewed from an inner surface side.

FIG. 5A is a perspective view of the sealing-member-equipped shielded cable 300 according to the third embodiment as viewed from an outer surface side, and FIG. 5B is a perspective view of the sealing-member-equipped shielded cable 300 as viewed from an inner surface side. Note that the same components as in the first embodiment are denoted by the same reference numerals, and repeated descriptions will be avoided.

As illustrated in FIG. 5A and FIG. 5B, in the sealing-member-equipped shielded cable 300 according to the third embodiment, a difference from the first embodiment and the second embodiment is that a sealing member 320 is molded from an electrically conductive resin.

Since the sealing member 320 is molded from an electrically conductive resin, it is not necessary to embed the electrically conductive member 30 at the time of molding the sealing member 320 from a resin as in the first embodiment and the second embodiment (see FIGS. 1A to 1C and FIGS. 4A to 4C).

Examples of the electrically conductive resin are thermoplastic resins such as a polyethylene and a polypropylene to which a conductivity-imparting agent (an electrically conductive filler) is applied. Examples of the electrically conductive filler are fillers of electrically conductive materials that are carbon-based, metal based such as Cu-based and Al-based, and the like, and the electrically conductive filler is to be applied in the form of flakes, powder, fibers, or the like. Here, the term "electrically conductive material" generally refers to a material having an electric resistance of $10^7$ Ω·cm or smaller.

When the sealing member 320 is molded by using an electrically conductive resin, ends of the shielded wires 11 from which a covering has been removed are disposed in a metal mold and embedded in the sealing member 320.

The sealing-member-equipped shielded cable 300 of the third embodiment basically provides advantageous effects similar to those of the first embodiment.

In particular, in the sealing-member-equipped shielded cable 300 of the third embodiment, the sealing member 320 is molded from an electrically conductive resin, and thus, the entire sealing member 320 is an electrically conductive portion. Therefore, the sealing-member-equipped shielded cable 300 provides an advantageous effect capable of electrically connecting the shielded wires 11 to the sealing member 320 simply by embedding the ends of the shielded wires 11 from which a covering has been removed in the sealing member 320, which has electrical conductivity.

Although preferred embodiments of the present invention have been described above, these are examples for describing the present invention, and the scope of the present invention is not intended to be limited to these embodiments. The present invention can be embodied in various aspects different from the above-described embodiments within the gist of the present invention.

For example, although the sealing members 20 and 220 are formed in a rectangular flange shape in the first embodiment and the second embodiment, the molded shapes of the sealing members 20 and 220 are examples and are not limited to the shapes described in the above-described embodiments.

In addition, although, in the first embodiment to the third embodiment, the shielded wires 11 are folded back on the inner surface side of the sealing members 20, 220, and 320 in order to dispose the ends of the shielded wires 11 from which a covering has been removed in a metal mold, the shielded wires 11 may be folded back on the outer surface side of the sealing members 20, 220, and 320.

What is claimed is:

1. A sealing-member-equipped shielded cable comprising:
   a shielded cable that includes a plurality of shielded wires; and
   a sealing member that is molded from a resin and at least a portion of which is an electrically conductive portion,
   wherein the sealing member is integrally formed on one end of the shielded cable,
   wherein ends of the shielded wires are twisted and electrically connected to the electrically conductive portion of the sealing member,
   wherein the sealing member is provided with at least one insertion hole, and
   wherein the electrically conductive portion is exposed around the insertion hole to an exterior of the sealing member on a front side of the sealing member;
   wherein the ends of the shielded wires pass through the sealing member to terminate in connection with the electrically conductive portion.

2. The sealing-member-equipped shielded cable according to claim 1,
   wherein the sealing member is integrally formed by increasing a diameter of the sealing member along a periphery of a connection-side end portion of the shielded cable.

3. The sealing-member-equipped shielded cable according to claim 1,
   wherein the electrically conductive portion of the sealing member is formed of an electrically conductive member.

4. The sealing-member-equipped shielded cable according to claim 3,
   wherein the electrically conductive member is a solderless terminal or a metal plate.

5. The sealing-member-equipped shielded cable according to claim 1,
   wherein the sealing member is molded from an electrically conductive resin, and
   wherein the ends of the shielded wires from which a covering has been removed are embedded in the sealing member.

6. A sealing-member-equipped shielded cable of claim 1, wherein the insertion hole does not receive the shielded wires.

7. The sealing-member-equipped shielded cable of claim 1, wherein the insertion hole is configured to receive a screw to attached the sealing member to a support.

8. The sealing-member-equipped shielded cable of claim 1, wherein the electrically conductive portion extends laterally from the shielded wires to the insertion hole.

9. The sealing-member-equipped shielded cable according to claim 3, wherein the electrically conductive member comprises a washer, a shaft extending from the washer, and a connector configured to connect to the shielded wires.

10. The sealing-member-equipped shielded cable according to claim 9, wherein the connector is a crimp connection.

11. The sealing-member-equipped shielded cable according to claim 1,
    wherein the electrically conductive member is a metal plate,
    wherein the sealing member is formed to have a two-layer structure of the metal plate and a resin layer, and
    wherein an end of the shielded wire from which a covering has been removed is electrically connected to the metal plate.

12. A sealing-member-equipped shielded cable comprising:
    a shielded cable that includes a plurality of shielded wires; and
    a sealing member that is molded from a resin and at least a portion of which is an electrically conductive portion,
    wherein the sealing member is integrally formed on one end of the shielded cable,
    wherein ends of the shielded wires are twisted and electrically connected to the electrically conductive portion of the sealing member,
    wherein the sealing member is provided with at least one insertion hole, and
    wherein the electrically conductive portion is exposed around the insertion hole to an exterior of the sealing member on a front side of the sealing member;
    wherein the shielded cable entirely passes through the front side to a rear side of the sealing member;
    wherein the ends of the shielding wires emerge from the shielded cable on the rear side of the sealing member, bend back into the rear side of the shielding member toward the front side of the shielding member, and terminate in connection with the electrically conductive portion on the front side of the shielding member.

13. An encoder using the sealing-member-equipped shielded cable according to claim 1.

14. An encoder using the sealing-member-equipped shielded cable according to claim 11.

* * * * *